Aug. 15, 1961  D. I. BOHN  2,996,648
INDUCTION MOTOR AND CONTROL SYSTEM
Filed July 25, 1958  3 Sheets-Sheet 1
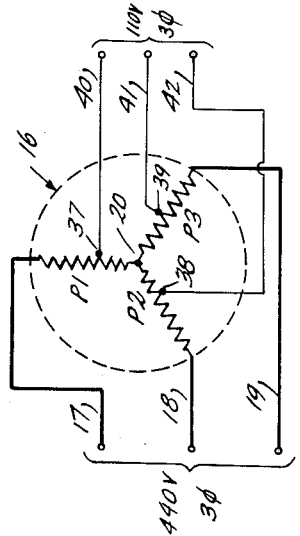
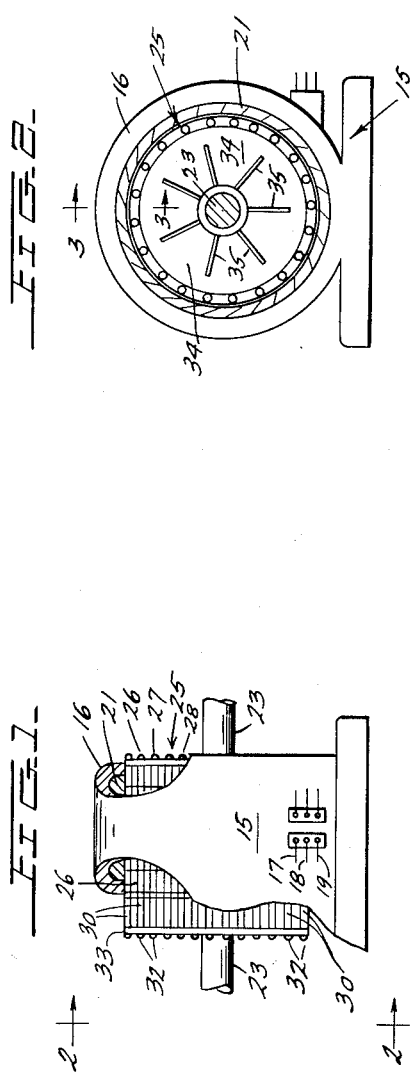
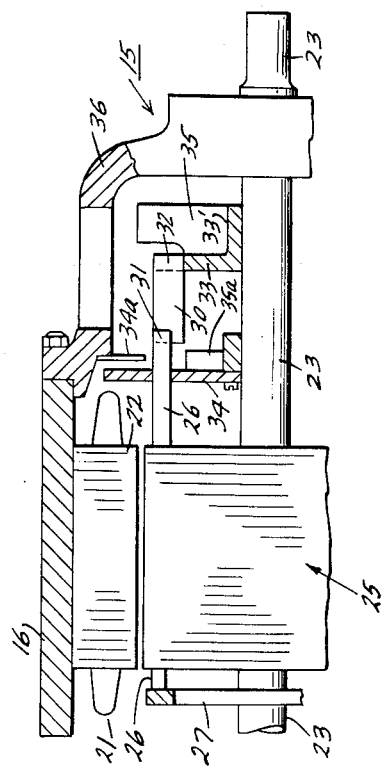
INVENTOR.
DONALD I. BOHN
BY Ostrolenk, Faber,
Gerb & Soffen
ATTORNEYS

INVENTOR.
DONALD I. BOHN

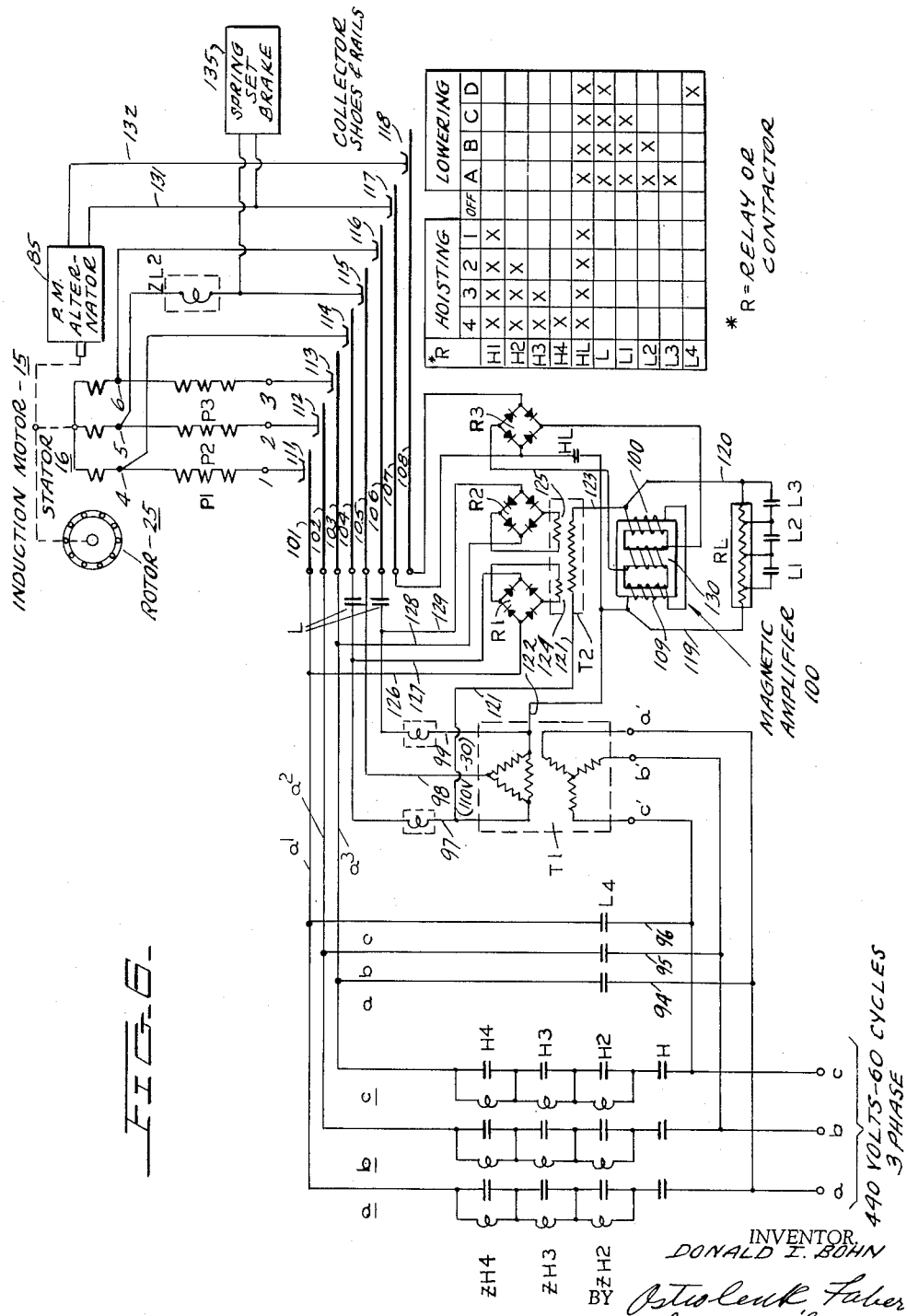

United States Patent Office 2,996,648
Patented Aug. 15, 1961

2,996,648
INDUCTION MOTOR AND CONTROL SYSTEM
Donald I. Bohn, 377 Country Club Road, Asheville, N.C.
Filed July 25, 1958, Ser. No. 751,014
10 Claims. (Cl. 318—212)

This invention relates generally to A.C. induction motor systems, and more particularly relates to novel induction motor constructions and control systems therefor.

There are many applications for electric motors which require operating characteristics that heretofore could only practicably be performed by direct current motors. Such include cranes, hoists, elevators, traction etc., where series D.C. motors are widely used. This invention provides a novel A.C. induction motor and electrical control therewith, that results in performance comparable to that by a series D.C. motor, as in cranes, hoists, etc. In this way the prevalent A.C. power sources are directly utilized for the invention motor system, and economies of initial cost and of operation are realized.

Most production cranes today are D.C. operated, primarily because a D.C. series motor for the hoist gives all of the desired results. No A.C. hoist has heretofore approached the D.C. series motor hoist. The system of the present invention is herein disclosed in connection with its application to a crane hoist, using the D.C. series motor hoist characteristics as the objective. These desirable characteristics of the D.C. series motor hoist may be listed as follows:

(1) The motor and hoist rating (lbs. and ft. per min.) are selected so that full load on the crane hook provides rated "hoisting" speed, and imposes full load on the motor.

(2) The smaller the load being lifted, the faster the hook speed above rated speed.

(3) With an empty hook, the only load is friction and the weight of cables, sheave, and hook, so "hoisting" speed is well above rated speed.

(4) The hook must positively move downward on any controller "lowering" position, with any load on the hook from zero to full load.

(5) On 1st position "lowering," and with full load on hook, speed must be less than one-half of rated speed.

(6) Other "lowering" speed positions should lower at successively higher speeds than (5).

This invention of an A.C. motor and control system closely approximates all of the above operating characteristics for "hoisting," and what is more difficult and important, for "lowering." The motor which I employ is considerably different than an ordinary squirrel cage induction motor, and one of these differences is the use of a very high slip rotor. In this way the hoisting characteristics are similar to that of a D.C. series motor, in that for lighter loads the speed is higher than for heavier loads, inherently. The extra high slip also gives an almost constant ratio of amperes to torque at any speed, permitting good hoisting control by stator voltage. For the "lowering" mode I apply: (a) a reduced A.C. potential to only a portion of the poles of each phase in the stator to produce a low lowering torque, e.g. 15% of the motor rating; together with (b) direct current in the stator windings arranged for controlled braking action. For the end "lowering" position I apply full A.C. potential to the stator, in reversed phase rotation to that used for hoisting.

A primary object of the present invention is to provide a novel A.C. induction motor and control systems therefor.

Another object of the present invention is to provide novel A.C. induction motor systems that operate comparably to D.C. series motors.

A further object of the present invention is to provide a novel A.C. induction motor constructions which have operating characteristics similar to those of D.C. series motors.

Still another object of the present invention is to provide novel polyphase A.C. motor control systems utilizing combined polyphase A.C. and D.C. in the motor windings for hoist lowering action, thus making unnecessary such costly and complicated braking devices as eddy current brakes.

Primary control is impractical with a low slip motor, as some 500% current will give a starting torque of less than 100%. With my invention motor, about 200% starting current will give 200% torque. Further, my high slip rotor hereof, gives a much greater braking torque for a given D.C. current in the stator than is the case with a low slip motor.

Still a further object of the present invention is to provide a novel A.C. induction motor with a built-in substantial slip, and having operating characteristics that approximate those of a series D.C. motor.

These and further objects of the present invention will become more apparent in the following description of an exemplary embodiment thereof taken in conjunction with the drawings in which:

FIGURE 1 is an end elevational view, partially broken away, of an exemplary three-phase A.C. induction motor in accordance with the invention.

FIGURE 2 is an end view of the motor of FIGURE 1, as seen from the line 2—2 thereof.

FIGURE 3 is an enlarged cross-sectional view through a portion of the motor, taken along the line 3—3 of FIGURE 2.

FIGURE 4 is a schematic electrical representation of the stator, and leads thereto, for the motor of FIGURES 1, 2 and 3.

FIGURE 6 is a full circuit diagram of the system of FIGURE 5.

Figure 5:
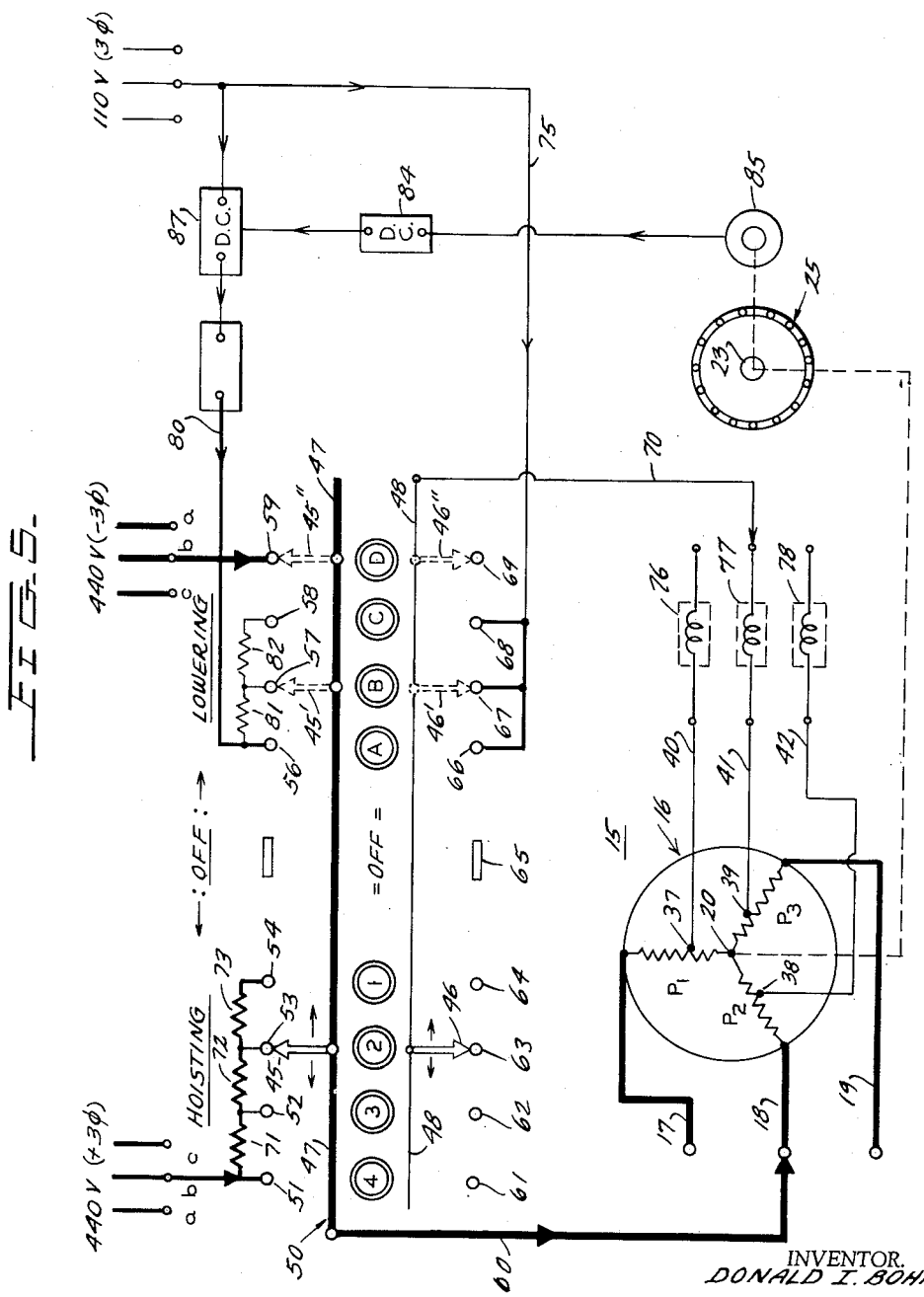
FIGURE 5 is an electrical schematic diagram of the exemplary A.C. induction motor control system of the invention.

The basic A.C. motor used in my invention system is a polyphase induction motor, preferably three-phase. Motor 15 comprises stator 16 with its three phases in Y-connection as shown in FIGURE 4, having main input leads 17, 18, 19 and common internal point 20. The stator windings 21 are wound conventionally about interior poles 22 for creating a rotating magnetic field for the rotor 25. Each phase is wound with a given number of poles ($p$) e.g. 8 or 10, and thereby establishes the basic speed of the motor in conjunction with the impressed line frequency ($f$). With low load and low slip ($s$) the motor speed ($n$) approaches the synchronous speed $n'$, where $$n' = \frac{2f}{p} \cdot 60 \text{(r.p.m.)}$$

and $n = n'(1-s)$, where slip is expressed as a fraction of synchronous speed ($n'$).

The rotor 25 is rotatably supported within stator 16 through shaft 23 set in suitable bearings. Rotor 25 in accordance with my invention is generally of the squirrel-cage type, having a number of low resistance solid copper bars 26 set in rotor peripheral slots. Bars 26 extend beyond the rotor core. At one end of bars 26 a low resistance shorting ring 27 is brazed to each end 28, and electrically interconnects the bars 26.

At the opposite end 31 of each bar 26 is connected a short strip of Nichrome metal 30, or other high resistance alloy, as by brazing. The far end 32 of each resistance strip 30 is interconnected, as by brazing, to a shorting end ring 33. End ring 33 is preferably a copper casting with a hub 33' mounted on the shaft 23 for rigidity. Cooling fins 35 extend from ring casting 33 (see FIGS. 2, 3). This feature is important in dissipating much of the heat from resistors 30, and minimizing heat flow back to the rotor 25 thru the rotor bars 26.

The function of resistance strips 30 is to produce a predetermined resistance in rotor 25 to result in a predetermined substantial slip at full load or rated torque output. For the exemplary crane hoist, a slip of 37% was used; it being understood that a higher, or lower built-in slip may be used instead. A conventional squirrel cage motor, with a large slip would develop too much internal heat to operate steady duty. In accordance with the invention motor construction I overcome this disadvantage.

The interior copper cage bars 26 are of low resistance, and therefore do not per se develop excessive heat under full load. However the built-in-resistance strips 30 develop substantially all of the heat due to the large slip (and currents) under load. The resistance strips 30 preferably are arranged to be outside of the main motor body as seen in FIGURES 1 to 3. In this way the resistance 30 end is not confined within the stator 16, and radiates heat to the outside. The resistor 30 heat is readily dissipated away from the motor 15 region by its rotation in use, and the use of large end bell 36 openings. An insulated air baffle 34 is used as shown in FIGURES 2 and 3 to minimize resistor 30 radiation to the motor 15 interior. Auxiliary radial fan blades 35a extend from the base of shield 34. A metal baffle 34a depends from the motor frame adjacent shield 34, as seen in FIGURE 3. Radial fan blades 35, 35a and shields 34, 34a assist in creating a suitable air flow to dissipate the heat from resistors 30 away from motor 15.

The exemplary motor 15 has a stator 16 with eight poles per phase P1, P2, P3, and three-phased in a Y connection as indicated in FIGURE 4. For control action during the "lowering" mode, connection is made to the internal two pole phase P1, P2, P3. These interpole connections are made through leads 40, 41 and 42. Other inter-pole points of connection for control leads 40, 41, 42 may instead be used. Also, for different speeds or applications, a different number of poles per phase is of course feasible. The physical location of the 3-phase 2-pole portion of the winding from center 20 to points 37, 38 and 39 is important. This entire 2-phase group is preferably located in one physical section of the stator, leaving approximately ¾ of the stator free to receive D.C. excitation without appreciable interference between the two sections of each phase thru rotor action. The remaining 6-pole winding sections of phases P1, P2, P3, are wound in the remaining ¾ section of stator 16.

With 60 cycle power input, the basic or synchronous speed ($n'$) for this 3-phase motor 15 is 900 r.p.m. However, at rated torque, and the built in 37% slip, full load torque occurs at 567 r.p.m. At lighter load the speed rises, approaching 900 r.p.m. with an empty hook. The "hoisting" characteristics of motor 15 are accordingly similar to those obtained with a D.C. series motor 15, the main input leads 17, 18, 19 are rated at 440 volts, 3 phase, 60 cycles. The secondary or control leads 40, 41, 42 are not used for the "hoisting" mode, as the ampere-torque ratio is very nearly constant. Primary control is effected for hoisting by impedance taps for voltages applied directly to stator leads 17, 18, 19 as shown in FIGURES 5 and 6.

FIGURE 5 is a schematic showing of the exemplary electrical control system for motor 15 as used in a crane hoist. The remainder of the crane apparatus is conventional, and not shown. The controller 50 comprises two arms 45, 46 that operate together along respective common buses 47 and 48 to the controller points or positions. Four controller positions are used for "hoisting," namely, (1), (2), (3) and (4); and four, for "lowering," namely (A), (B), (C) and (D). The central position is "Off," for the crane control action, with motor 15 unenergized.

The positions from either side of "off" are for increasing torque or load conditions; (4) is maximum for hoisting; with (D) maximum for lowering. A simplified single-phase diagram is used in FIGURE 5 for clarity; FIGURE 6 being a comprehensive three-phase circuit of an exemplary system.

The "hoisting" control circuit is relatively simple. Motor 15 with 37% slip has a starting torque of 205% of full load torque with full load voltage (440 volts) applied to stator 16. The phase of connection of 440 volt three-phase line input to motor 15 for hoisting positions 1, 2, 3, 4 is made to rotate rotor 25 and move the crane hook (not shown) in the hoist or upwards direction. This phase is indicated as $a$, $b$, $c$, and connected directly to contact 51 of the controller 50, namely to maximum hook load (or motor torque) position (4). The full 440 volts is thereby applied to stator 16 at this position (4), when arm 45 connects with contact 51. Rail 47 connects to lead 18 of motor 15 through connection 60, with corresponding contactors and contacts for the other phases ($a$ and $c$) for input leads 17 and 19.

The positions for lower torque or load in the hoisting mode are effected at (3), (2) and (1). These are provided at contacts 52, 53 and 54 respectively, in association with arm 45. Individual impedances, such as dropping resistors, or preferably reactors, 71, 72 and 73 are connected in series between taps 51 to 54. Thus successively lower input voltage is applied to stator 16. A practical stalled torque or starting torque range for positions (1) to (4) is 75%, 120%, 160% and 205%. The torque output of a squirrel cage motor varies as the square of the applied voltage. The impedances 71, 72, 73 are thereby selected to provide these respective voltages for positions (1) through (4): 266 volts, 337 volts, 388 volts, and 440 volts with rotor stalled. The hoist characteristics with these "hoisting" positions are very similar to those with a D.C. series motor, including the lively fast empty hook characteristic.

When lowering a load, there are three torques to be considered. These are:

(1) A torque in the lowering direction provided by the motor.

(2) A torque in the lowering direction provided by the load.

(3) A braking torque.

My invention system provides torques (1) and (3) in the motor itself. No external control braking is provided. A spring-set magnet released friction brake is employed as with any hoist, to hold the load when in the "Off" position.

These characteristics are obtained by electrically (and magnetically) breaking up the stator winding 16 into two groups. One of these groups consists of 2 adjacent poles for each of the 3 phases, and another group of 6 adjacent poles for each of the 3 phases. This is effected by taps 37, 38, 39 in stator 16 with leads 40, 41, 42 as described hereinabove. No great lowering torque from the motor is ever required. If the hook is empty, some 10% or 15% of rated torque will drive the hook downward. If any load is on the hook, any lowering torque from the motor is unnecessary, but not harmful if sufficient braking torque is present to equal the load lowering torque and the motor lowering torque at a suitable low speed.

I use two poles of each phase P1, P2, P3, (¼ of the stator) to provide a lowering torque of about 15% of rated torque on all lowering points except the last one (D). This is done by applying 110 volts 3 phase to these two pole groups through leads 40, 41, 42. To limit the current a series impedance is inserted in each leg of this 110 volt 3 phase supply. This part of the control system is used for the (A), (B) and (C) lowering points. Further, in connection with the reduced A.C. lowering torque for positions (A), (B), and (C) I connect direct current into two of the phase windings P1, P2, P3 in opposite directions. I have found that direct current of approximately full load rating connected in two phases, applied in opposite polarity directions, (as described in detail hereinafter in connection with FIGURE 6), provides sufficient torque to equal the sum of the lowering motor torque from the two A.C. energized poles, and a lowering torque equivalent to full load on the hook. Direct current may also be used in the third phase, but with little advantage over that of the two phases hereof. The applied D.C. braking current is made highest for the first "lowering" position (A), and made least for the third or last D.C. braking position for which it is used, namely (C). The value of this D.C. braking torque may be substantially independent of speed, except at quite low speeds. To provide stability, the value of the D.C. braking current is made to increase somewhat with speed, as well as being different for each controller point. This is provided by a voltage tachometer control.

Summarizing, the lowering arrangement, (except for the last (D) control point) provides:

(1) Apply a fixed three-phase voltage to the two-pole portions of the stator, with a fixed impedance in each leg as a curent limitor, the torque being in the lowering direction.

(2) Send a D.C. current thru two phases of the 6 pole portion of the stator winding, in opposite directions, for braking.

(3) The value of this D.C. braking current is made, (for a given speed) maximum for the 1st lowering point (A) and minimum for the next to the last (C) lowering point.

(4) The value of this D.C. braking current is increased with speed, on lowering points (A), (B), (C) when used.

The circuit arrangement for the "lowering" mode, positions (A), (B) and (C) is indicated in FIGURE 5. The low voltage input A.C. line is at 110 volts, three-phase via lead 75 to interconnected contacts 66, 67, 68 of contactor 50. When arm 46, as at 46', connects with taps 66, 67 or 68, the 110 volts is impressed across the two-pole sections of stator 16 through lead 70 from rail 48. Limiting reactors, inductances 76, 77, 78 are placed in series between lead 70 and stator leads 40, 41 42 to prevent overloading the two-pole groups at low speeds.

The corresponding D.C. braking current is applied to the six-pole sections of two of the stator phases P1, P2, P3 through schematically shown arm 45 and rail 47 of contactor 50. FIGURE 6 more fully illustrates exemplary connections thereof. The D.C. lead 80 to the contactor connects directly at tap 57, at the first lowering or (A) position. The successive decreased D.C. current values to positions (B) and (C) result from the series impedances 81, 82 between contacts 56, 57, 58. The D.C. impressed on contacts 56, 57, 58 through lead 80 comprises two components; one rectified at 83 from the 110 volt line 75; the other rectified from voltage tachometer 85, at rectifier 84. Tachometer 85 is coupled to rotor 25 through link 86. A D.C. integrator 87 combines the outputs of rectifier 83, 84 for lead 80.

The last "lowering" position (D) is differently composed than the others. In this position (D), the entire high voltage three-phase line is connected across the stator 16, with its phase rotation reversed from that used in "hoisting." When on this point (D), with an empty hook the motor 15 speed is near 900 r.p.m. With full load on the hook, the speed will be stable at about 1,200 r.p.m. It is noted that, due to the mechanical efficiency of hoists, a 100% load will only drive the motor 15 with a torque of about 75% of the motor rating. Thus negative slip, the motor being an induction generator, occurs at only about 26% instead of 37% in such case. The position (D) is provided at contact 59 to arm 45 when at 45″. The 440 volt three-phase line is applied to contact 59 in phase relation c, b, a, reversed from that to contact 51.

FIGURE 6 is a circuit diagram of the exemplary control system for the crane hoist hereof using a three-phase A.C. induction motor as described in connection with motor 15 of FIGURES 1 to 4. Also, the principles and features of the schematic control circuit of FIGURE 5 are included in suitable commercial form. When 3-pole contactor H1 is closed (1st point hoisting), the full three-phase power (at 440 volts) is impressed in series with impedances ZH2, ZH3 and ZH4 in each phase, on terminals 1, 2, 3 of stator 16 of motor 15. As previously mentioned, series impedances (either reactances or resistors) ZH2, ZH3, ZH4, provide the desired 1st point (lowest) torque. For the 2nd point the ZH2 impedances are shorted by contactor H2; and similarly for H3 and H4.

The stator 16 terminals 1, 2, 3 are supplied through collector rails 101, 102, 103 with shoes 111, 112, 113 through three phase leads 91, 92, 93 from the motor relay system H1 to H4. The phase relation a, b, c, is applied to phases P1, P2, P3 to effect proper "hoisting" motor rotation. Manual control of the H and L relay or contactor system of FIGURE 6 is understood by those versed in the art. The FIGURE 6 table of relay energization for the "hoisting' and "lowering" positions defines the interconnections produced in the control system therefor. For example in "hoisting" position (4) all the H relays, namely H1, H2, H3, H4 are energized and their contacts shown in FIGURE 6 closed in each line phase a, b, c, This shorts out all impedance ZH2, ZH3, ZH4, and applies the full three phase 440 volts to terminals 1, 2, 3 of stator 16 for full hoisting torque and power.

Correspondingly for position (3) one set of impedances remains inserted in series as the H4 contactor is unenergized and the ZH4 set of inductors reduces the voltage applied to stator 16 to a desired intermediate value as referred to hereinabove for position (3) in FIGURE 5. For position (2) the H contactor is also unenergized, as noted in the table, and the further impedances ZH3 are in circuit to further reduce the line voltage to the motor 15. In position (1) all the impedance contactors H2, H3, H4 are open, and all the impedances ZH2, ZH3, ZH4 are in the line. In the "Off" position, all the H and L relays remain open, as in the common HL relay, with no motor 15 energization resulting.

The fourth "lowering" position (D) as described in connection with FIGURE 5, has the full (440 volt) line voltage applied to stator 16. This is accomplished by simply energizing contactor L4, as noted in the table, with the H contactors left open. The lines 94, 95, 96 to relay L4 connect to main line phases a, b, c, and are in turn connected to motor lines 91, 92, 93 to produce a reversed phase relation at stator terminals 1, 2, 3, namely c, b, a. In the position (D), the required energization of motor 15 is thus directly accomplished as the other L relays are open and no auxiliary control voltages are applied at that time.

The first three "lowering" positions, (A), (B), (C) are circuitally effected in the manner of the FIGURE 5 system. The lowered three phase power at 110 volts is derived from the three phase transformer T1, the input leads a′, b′, c′ are connected to the main line a, b, c. The output leads 97, 98, 99 of transformer T1 secondary is at the indicated 110 volts three phase, and provides "lowering" drive to motor 15 when connected to the intermediate two-pole sections at stator terminals 4, 5, 6. A current limiting impedance is arranged in each 110 volt power lead to the stator two-pole sections; inductor ZL1 in lead 97 to terminal 4 through collector rail 104 and shoe 114 to terminal 4; inductor ZL2 in lead 98, through rail 105-shoe 115 to terminal 5; and inductor ZL3 in lead 99, through rail 106-shoe 116 terminal 6. Lead 98 is in direct connection with rail 105 and on through to stator terminal 5. The 110 volt three phase power is applied to stator 16 when relay L is energized, closing contacts between lines 97 and 99 to respective rails 104 and 106. As noted in the table of FIGURE 6, this occurs for the three "lowering" positions (A), (B), (C).

The controlled D.C. braking current to the six-pole sections of stator 16 is provided simultaneously with the 110 volt three phase current to the two-pole sections, as hereinabove set forth. In the FIGURE 6 control system, the basic direct current is derived from full wave rectifiers R1 and R2. Step-down transformer T2 supplys A.C. energy to these rectifiers. The primary winding of transformer T2 is supplied by variable A.C. through magnetic amplifier 100. A single phase 110 volt tap from transformer T2, through leads 121, 122 and lead 123 provides this arrangement. The secondary winding 124 of transformer T2 directly supplies rectifier R1; secondary 125, rectifier R2.

Output leads 126, 127 of rectifier R1 connects across the six-pole section of phase P1 at stator terminals 1 and 4 when relay L is energized. Similarly, output leads 128, 129 of rectifier R2 connects across the six-pole section of phase P3 at stator terminals 3 and 6. It is noted that the polarity of the respective direct current in phases P1 and P3 are opposite to effect the braking action hereinabove described. Further, when relay L is unenergized the D.C. power in to phase P3 is off. Even though A.C. voltage exists between stator terminals 4 and 6, this does not affect the D.C. stator circuits as there is only one common point connecting a D.C. circuit to A.C., the rectifier windings on transformer T2 being isolated from each other and the primary.

The A.C. windings 109, 110 of a small conventional magnetic amplifier 100 are connected in series with the primary of transformer T2. Also, the resistor RL shunts the A.C. windings 109, 110 of the magnetic amplifier 100 through leads 119, 120. This resistor RL with its shunting relays L1, L2, L3, provide the manual control of the D.C. braking current value to stator 16. At the first lowering position (A) all three relays L1, L2 and L3 are closed, shunting corresponding sections of resistor RL to result in maximum direct current output from rectifiers R1, R2 to stator 16. At position (B) only relays L1 and L2 remain closed; and at position (C) relay L1. This provides the direct current braking control action.

The additional control of D.C. braking current is made speed responsive by means of the small permanent magnet alternator 85 preferably mounted on and driven by the motor 15. Its voltage is proportional to the motor speed. A small rectifier R3 is connected to output leads 131, 132 of alternator 85 through rails 107, 108 and shoes 117, 118. Rectifier R3 provides D.C. ampere turns to the middle leg 130 of the magnetic amplifier 100. An increase in motor 15 speed is thus arranged to increase the D.C. braking current to stator 16 on any lowering point except the last one at (D).

Power at 110 volts 60 cycles is made available for releasing the usual crane spring set friction brake 135 in either the "lowering" or "hoisting" position of the controller. This is done by making relay contactor L only 2 poles, and locating one of the series impedances ZL2, at the motor side. Also, the impedances ZL1 and ZL3 are located back at the control board, not directly in the D.C. braking circuit as shown in FIGURE 6.

In the exemplary control system of figure, transformer T1 had a rating of one-fourth that of the rated KVA of motor 15; transformer T2, about 8%. Rectifiers R1 and R2 were rated in KW about 4% of the motor KVA. I have found that the ratings of alternator 85 and rectifier R3 need only be a few watts for even relatively large motor installations. The motor 15 thereof was a three-phase induction motor with a 440 volt sixty cycle rated stator input, and eight poles per phase with a rated basic speed of 900 r.p.m. The rotor was a squirrel cage type with copper bars along the rotor core, and extensions of Nichrome resistance strips as described hereinabove in connection with FIGURES 1 through 4, proportioned to provide effective rotor resistance to have 37% slip at rated torque and load.

An alternate hoist control system with the motor of my invention hereof, utilizes a stepless controller arrangement. In the stepless control the contactors H2, H3, H4 together with their associated impedances ZH2, ZH3, ZH4 are omitted, see FIGURE 6. The H1 contactor is retained in the "hoisting" mode of operation. Three single-phase or one three-phase magnetic amplifier is connected in for all accelerating points. A few watts of power handled by a rheostat on the controller provides a stepless control, with the aforesaid performance characteristics. For "lowering," resistor RL and relays L1, L2, L3 are omitted (see FIGURE 6). A second D.C. control winding is placed on the middle leg 130 of the lowering magnetic amplifier 100. A control rheostat is used to control the current in said second winding, to effect lowering action in a stepless manner.

Although I have described an exemplary induction motor and control systems therefor, it is to be understood that modifications and variations thereof are feasible within the broader spirit and scope of my invention, as set forth in the following claims.

I claim:

1. A hoist control of the character described comprising a polyphase induction motor having a stator with a winding for each phase arranged as a plurality of poles, a first set of terminals for energizing each of said windings, a second set of terminals connected to an intermediate winding section of each phase for applying control energy thereto, a rotor rotatably supported within said stator, circuit means for impressing polyphase line voltage to said first set of stator terminals in incremental voltage steps for the hoisting operation mode, and control means for concurrently connecting both polyphase alternating current and direct current to said first and second stator terminal sets to effect lowering operation mode characteristics in incremental torque steps.

2. A hoist control as claimed in claim 1, in which said control means is arranged to connect the polyphase alternating current at relatively low voltage to said second set of terminals and effect a low torque lowering drive and to connect the direct current to said stator phases and in incremental current steps, providing operation mode characteristics by the induction motor comparable to that by a series D.C. motor.

3. A hoist control system of the character described comprising a polyphase induction motor having a stator in Y connection with a winding for each phase arranged as a plurality of poles, a first set of terminals for energizing each of said windings, a second set of terminals connected to an intermediate winding section of each phase for applying control energy thereto, a rotor rotatably supported within said stator, electrical means connected for imparting a substantial slip to the rotor operation characteristics, circuit means for impressing polyphase line voltage to said first set of stator terminals in incremental voltage steps for the hoisting operation mode, and control means for concurrently connecting both polyphase alternating current and direct current to said first and second stator terminal sets to effect lowering operation mode characteristics in incremental torque steps, and means including circuit connections for varying the direct current applied to said stator in accordance with the motor speed.

4. A hoist control system as claimed in claim 3, in which said control means is arranged to connect the polyphase alternating current at relatively low voltage to said second set of terminals and effect a low torque lowering drive and to connect the direct current to said stator phases and in incremental current steps, providing operation mode characteristics by the induction motor comparable to that by a series D.C. motor.

5. A hoist control as claimed in claim 1, in which the polyphase alternating current applied to the stator intermediate winding sections is connected through said second terminal set, and the direct current applied to the remainder of stator windings is across the first and second set terminals thereof, the electrical return path of each the said applied direct currents being electrically independent from each other and from the concurrently applied alternating current.

6. A hoist control as claimed in claim 2, further including current limiting inductors between the low voltage polyphase alternating current and said second set of stator terminals.

7. A hoist control as claimed in claim 4, further including current limiting inductors between the low voltage polyphase alternating current and said second set of stator terminals.

8. A motor control system comprising a polyphase induction motor having a stator in Y connection with a winding for each phase, and relatively high slip rotor rotatably supported within said stator, a first set of terminals individually connected to the outer end of each of said windings, a second set of terminals individually connected to an intermediate section of each of said windings and control means for concurrently connecting polyphase alternating current and direct current to said first and second terminal sets to effect operating mode characteristics by the induction motor comparable to that by a series D.C. motor.

9. A motor control system as claimed in claim 8, in which the polyphase alternating current applied to the stator intermediate winding sections is connected through said second terminal set, and the direct current applied to the remainder of stator windings is across the first and second set terminals thereof, the electrical return path of each the said applied direct currents being electrically independent from each other and from the concurrently applied alternating current.

10. A motor control system as claimed in claim 9 further including current limiting inductors between the polyphase alternating current and said second set of stator terminals.

References Cited in the file of this patent

UNITED STATES PATENTS

| | | |
|---|---|---|
| 1,719,889 | Kelsey | July 9, 1929 |
| 1,851,155 | Schmid-Burgk et al. | Mar. 29, 1932 |
| 2,196,402 | Snyder | Apr. 9, 1940 |
| 2,677,087 | Willmott | Apr. 27, 1954 |
| 2,793,338 | Rhyne et al. | May 21, 1957 |
| 2,847,630 | Holt et al. | Aug. 12, 1958 |